Figure 1:
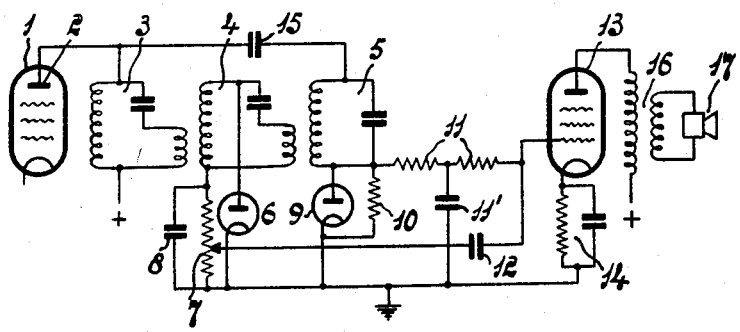

May 8, 1956  A. VAN WEEL  2,745,003

RADIO RECEIVER WITH INTERCHANNEL NOISE SUPRESSION

Filed March 1, 1952

INVENTOR
Adelbert Van Weel
By
Agent

# United States Patent Office 2,745,003
Patented May 8, 1956

2,745,003

RADIO RECEIVER WITH INTERCHANNEL NOISE SUPPRESSION

Adelbert van Weel, Eindhoven, Netherlands, assignor to Hartford National Bank and Trust Company, Hartford, Conn., as trustee Application March 1, 1952, Serial No. 274,426

Claims priority, application Netherlands March 20, 1951

6 Claims. (Cl. 250—20)

The invention relates to a radio-receiving circuit-arrangement for producing a direct voltage which varies with the detuning of a circuit with respect to a signal voltage. Such a direct voltage may be used to provide an indication of the current tuning, for cutting-off the reception if the receiving apparatus is not correctly tuned (the so-called silent tuning) and for other purposes.

It is common practice in producing such a direct voltage to use a circuit comprising a tuned circuit, to which the signal voltage is supplied, a rectifier and a ressitor, the arrangement being such that said direct voltage occurs across the said resistor. This voltage has an extreme value if the signal frequency is equal to the resonant frequency of the circuit.

The object of the invention is to provide a circuit-arrangement to produce a direct voltage varying with the detuning of a circuit with respect to a signal voltage, in which this voltage has an extreme value, more particularly, zero value when the circuit is properly tuned and in which the said voltage deviates very rapidly from this value when the circuit is detuned.

The invention is characterized in that three circuits are included, to the first of which the signal voltage is supplied, this first circuit being coupled with the second circuit, which is coupled with the third circuit and in that the first and the third circuit are included in series in the rectifying circuit in a manner such that the voltages across these circuits are in phase opposition in the rectifying circuit when the signal frequency corresponds with the natural frequency of these circuits.

Use is made here of the known phenomenon that when a band-pass filter includes two relatively reactively, i. e. inductively or capacitatively, coupled circuits tuned to the same frequency, the voltage across the second circuit exhibits a 90° phase shift with respect to the voltage across the first circuit when both circuits are tuned to the signal frequency. If the second circuit is coupled with a third circuit which in turn is tuned to the signal frequency, in the resonant condition a 90° phase shift again occurs, so that the voltage across the third circuit is in phase or in phase opposition with respect to that across the first circuit. If the first circuit and the third circuit are connected in series, it is possible in the latter case with suitable proportioning of the circuit elements to ensure that the voltages together are exactly equal to zero in the tuning when the circuits are tuned and the resultant voltage increases rapidly when the circuits are detuned.

If the invention is carried out as in this case, the total voltage produced across the resistor in the rectifying circuit is also equal to zero in the case of correct tuning.

In order to avoid undesired coupling between the first and the third tuned circuits, which might be caused by the rectifying element, the first circuit is preferably connected between a point of constant voltage (ground) and a tapping of the third tuned circuit, which is connected on the one hand through the rectifier to a parallel connected resistor and on the other hand through an imitation impedance to the point of constant voltage.

If the imitation impedance is suitably proportioned, the undesired coupling may thus be completely compensated for. The imitation impedance will, in general, be the parallel connection of a resistor and a capacitor.

It should be noted that it is already known for circuit arrangements for eliminating interference frequency to use a cascade arrangement of three tuned pairwise coupled circuits, the first and the third circuit supplying voltages of the interfering frequency which oppose each other in the input circuit of an amplifying tube. With so-called discriminator circuits it has also been suggested to use the cascade arrangement of a number of circuits, the voltage occurring across the first and the last circuits acting upon a rectifying circuit in a manner such that a direct voltage occurs across an impedane included in this circuit which has a value of zero when the circuit is correctly tuned. However, this direct voltage assumes values of opposite polarities as the circuit is detuned from one direction to the other.

Figure 2:
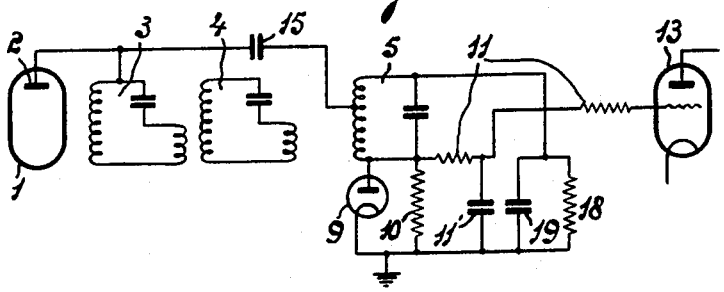
Figure 3:
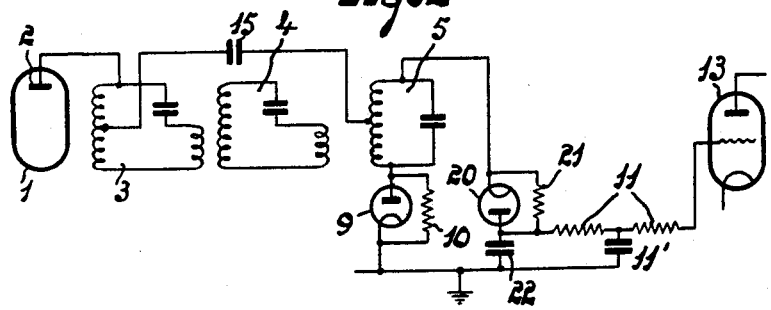

In order that the invention may be more clearly understood and readily carried into effect, it will now be described more fully with reference to the accompanying drawing, in which:

Fig. 1 shows a circuit-arrangement for so-called silent tuning, in which the invention is used; and Figs. 2 and 3 show modified embodiments.

Referring to Fig. 1, 1 designates an intermediate frequency amplifying tube for use in a radio-receiving apparatus of the superheterodyne type; the anode of this tube is coupled through circuit 3 tuned to the intermediate-frequency to the positive terminal of a voltage supply. This circuit is coupled with a second circuit 4, which is also tuned to the intermediate frequency and the latter is coupled with a third circuit 5, tuned to the intermediate frequency. The coupling between the circuits may be comparatively weak. Any direct coupling between the circuits 3 and 5 is avoided as much as possible. One end of the circuit 4 is connected through a detector comprising a diode rectifier 6 and the other end through the parallel connection of a resistor 7 and a capacitor 8 to ground. The capacitor 8 presents a low impedance to the intermediate frequency voltages and a high impedance to the low-frequency voltage modulated thereon.

The low-frequency modulation voltages are produced across resistor 7 and are supplied to the first grid of a low-frequency amplifying pentode tube 13. The cathode of this tube may be connected through the parallel connection of a resistor and a large capacitor to ground. The latter serves to obtain the correct grid bias voltage, but it may be dispensed with, if the grid bias voltage is produced in another way. The anode circuit of the tube 13 comprises the primary winding of a low-frequency transformer 16, the secondary winding of which is connected to the reproducing device 17 or to a subsequent amplifier.

The circuit-arrangement for silent tuning comprises a diode 9 and a resistor 10, connected in parallel with the former, both of them being connected between one end of the circuit 5 and ground. Resistors 11, which serve to filter the direct voltage across the resistor 10 are connected between the lower end of the circuit 5 and the control-grid of the tube 13, the common point of these resistors being grounded through a filter capacitor 11'. The capacitor 15, which may have a comparatively low capacity, is connected between the anode of the tube 1 and the other end of the circuit 5.

The capacitor 12 is a blocking capacitor.

If the receiving apparatus is detuned to a certain extent with respect to the incoming signal, the phase-shift between the voltages across the circuits 3 and 5 will differ from 180° and the resultant voltage is rectified by the rectifier 9, so that a comparatively high direct voltage is produced across the resistor 10 and the first control-grid of the tube 13 has a negative bias voltage sufficient to render the tube inoperative. With correct tuning the voltages across the circuits 3 and 5 approximately neutralize one another in the circuit of the diode 9, so that no voltage is produced across resistor 10 and the tube 13 can perform its normal amplifying function.

Because capacitor 15 is included in the circuit, the diode circuit 9, 10 provides a certain degree of coupling between the circuits 3 and 5, which may, under certain conditions, interfere with the desired effect. In order to substantially eliminate this coupling, the circuit 3 may be connected through the capacitor 15 to a tap on the inductance of the circuit 5, as is shown in Fig. 2. For this purpose the top end of the circuit 5 is grounded through the parallel connection of the resistor 18 and the capacitor 19. If the tap is located exactly in the center of the inductance of the circuit, the capacity of the capacitor 19 is required to be approximately equal to that of the diode 9 and the resistor 18 is required to be one-third of the load resistor 10, in order to substantially eliminate this undesirable coupling.

The said coupling may be more effectively eliminated if the top end of the circuit 5 is grounded through a diode 20 and associated circuit comprising a parallel-connected resistor 21 and series-connected capacitor 22, as is shown in Fig. 3. In this case the diodes 9 and 20 are included in the same sense in the circuit, so that the direct voltages occurring across the resistors 10 and 21 are added to one another. The proportioning of these is so chosen that with correct tuning no direct voltage is produced across the resistors 10 and 21. If the connection to the circuit 3 is effected via the center of the inductance of the circuit 5, the troublesome coupling will be substantially compensated for if the diodes 9 and 20, as well as the resistors 10 and 21, are equal to one another. The voltage which serves to cut off the low-frequency amplifying tube 13 is taken in this case from the terminals of the capacitor 22.

The voltage across the circuit 3 may considerably exceed that across the circuit 5, so that if the circuit-arrangement shown in Figs. 1 and 2 is used, the sum of the voltages across the rectifying circuit cannot be substantially equal to zero in the case of correct tuning. In this case the voltage of the first circuit may be taken from a tapping of the inductance of this circuit, as is shown in Fig. 3. In the modifications shown in Figs. 2 and 3, the low-frequency signal may, if desired, be detected and fed to the grid of tube 13 by means of the elements 6, 7, 8 and 12 shown in Fig. 1, or by other suitable means.

The direct voltage which provides the automatic gain control may be derived in the circuit-arrangements described above from the first circuit 3 by means of conventional circuit having a diode and a resistor (not shown in the figures). The direct voltage which occurs across this resistor and which is proportional to the mean carrier-wave amplitude is, in this case, operative in known manner at the control grid of one or more preceding high-frequency or intermediate frequency amplifying tubes.

What I claim is:

1. In a radio receiver, apparatus for deriving from a first resonant network responsive to an incoming signal a direct voltage which varies in accordance with the detuning of said first network with respect to said signal, said apparatus comprising second and third resonant networks, both of which are tuned to the resonant frequency of said first network, said second and third networks being respectively reactively coupled to said first and second networks in succession, said first and third networks being connected electrically in series and in phase opposition, whereby the output voltages across said first and third networks are substantially equal and in phase opposition when the signal frequency is equal to said resonant frequency and exhibit a phase displacement relative to each other which varies with said detuning when the signal frequency differs from said resonant frequency, a rectifier circuit provided with a rectifier element and a resistance element, and means serially coupling said first and third networks, excluding said second network, and said rectifier circuit to produce said direct voltage across said resistance element by rectification of the combined said output voltages, whereby said direct voltage is of substantially zero value when said signal and resonant frequencies are equal.

2. A radio receiver as set forth in claim 1 wherein said resistance element is connected across said rectifier element, said rectifier circuit further including a capacitance connected across said resistance element.

3. In a radio receiver, apparatus for deriving from a first resonant network responsive to an incoming signal a direct voltage which varies in accordance with the detuning of said first network with respect to said signal, said apparatus comprising second and third resonant networks, both of which are tuned to the resonant frequency of said first network, said second and third networks being respectively inductively coupled to said first and second networks in succession, a condenser connected between ends of said first and third networks and connecting said first and third networks in electrical series and in phase opposition, whereby the output voltages across said first and third networks are substantially equal and in phase opposition when the signal frequency is equal to said resonant frequency and exhibit a phase displacement relative to each other which varies with said detuning when the signal frequency differs from said resonant frequency, a rectifier circuit provided with a rectifier element and a resistance element, and means serially coupling said first and third networks, excluding said second network, and said rectifier circuit to produce said direct voltage across said resistance element by rectification of the combined said output voltages, whereby said direct voltage is of substantially zero value when said signal and resonant frequencies are equal.

4. A radio receiver as set forth in claim 3 wherein said third network includes an inductance one end of which is coupled through said rectifier circuit to a point of constant potentials, said apparatus further including a capacitance and a resistance connected across said capacitance to form a parallel circuit, said parallel circuit being coupled between the other end of said inductance and said point of constant potential.

5. A radio receiver as set forth in claim 3 wherein said third network includes an inductance one end of which is coupled through said rectifier circuit to a point of constant potential, said apparatus further including a capacitor having a terminal thereof connected to said point of constant potential, and a rectifier member interposed between the other end of said inductance and the remaining terminal of said capacitor, said rectifier circuit and said rectifier member being connected in the same electrical sense to produce additive rectified voltages.

6. In a radio receiver, apparatus for deriving from a first resonant network responsive to an incoming signal a direct voltage which varies in accordance with the detuning of said first network with respect to said signal, said first network being provided with a tap intermediate its ends, said apparatus comprising second and third resonant networks both of which are tuned to the resonant frequency of said first network, said second and third networks being respectively inductively coupled to said first and second networks in succession, a tap intermediate the ends of said third network and connected electrically to said first-named tap thereby connecting portions of said networks in series and in phase opposition, whereby the output voltages across said first and third networks are substantially equal and in phase opposition when the signal frequency is equal to said resonant frequency and exhibit a phase displacement relative to each other which varies with said detuning when the signal frequency differs from said resonant frequency, a rectifier circuit provided with a rectifier element and a resistance element, and means serially coupling said first and third networks, excluding said second network, and said rectifier circuit to produce said direct voltage across said resistance element by rectification of the combined said output voltages, whereby said direct voltage has substantially zero value when said signal and resonant frequencies are equal.

References Cited in the file of this patent

UNITED STATES PATENTS

| | | |
|---|---|---|
| 2,159,753 | Steimel | May 23, 1939 |
| 2,263,633 | Koch | Nov. 25, 1941 |
| 2,282,101 | Tunick | May 5, 1942 |
| 2,344,697 | Hollingsworth | Mar. 21, 1944 |
| 2,617,019 | Hepp | Nov. 4, 1952 |
| 2,630,527 | Vilkomerson | Mar. 3, 1953 |